United States Patent
Lecourtier

(10) Patent No.: US 9,787,134 B2
(45) Date of Patent: Oct. 10, 2017

(54) MICRO POWER OUTAGE COMPENSATING MODULE FOR A SERVER

(71) Applicant: BULL SAS, Les Clayes sous Bois (FR)

(72) Inventor: Georges Lecourtier, Versailles (FR)

(73) Assignee: BULL SAS, Les Clayes sous Bois (FR)

( * ) Notice: Subject to any disclaimer, the term of this patent is extended or adjusted under 35 U.S.C. 154(b) by 0 days.

(21) Appl. No.: 14/750,226

(22) Filed: Jun. 25, 2015

(65) Prior Publication Data
US 2015/0380985 A1 Dec. 31, 2015

(30) Foreign Application Priority Data

Jun. 27, 2014 (FR) .................................. 14 56044

(51) Int. Cl.
| | |
|---|---|
| G06F 11/00 | (2006.01) |
| H02J 9/06 | (2006.01) |
| G06F 1/30 | (2006.01) |
| H02J 7/34 | (2006.01) |
| H02J 7/00 | (2006.01) |

(52) U.S. Cl.
CPC ............... H02J 9/061 (2013.01); G06F 1/30 (2013.01); H02J 7/0068 (2013.01); H02J 7/0072 (2013.01); H02J 7/345 (2013.01); H02J 9/062 (2013.01)

(58) Field of Classification Search
CPC ................................................... H02J 7/0072
USPC .................... 714/14, 15, 20, 22, 23, 24
See application file for complete search history.

(56) References Cited

U.S. PATENT DOCUMENTS

| | | | | |
|---|---|---|---|---|
| 5,008,794 A | * | 4/1991 | Leman ............... | H02M 3/33561 363/21.16 |
| 5,602,726 A | * | 2/1997 | Sakai ....................... | H02J 9/061 363/21.12 |
| 6,212,081 B1 | | 4/2001 | Sakai | |
| 2009/0289607 A1 | | 11/2009 | Mentelos | |
| 2011/0140513 A1 | | 6/2011 | Brookfield | |
| 2011/0234020 A1 | * | 9/2011 | Lai ........................... | H02H 3/14 307/326 |

OTHER PUBLICATIONS

FR Search Report, dated Apr. 15, 2015, from corresponding FR application.

* cited by examiner

*Primary Examiner* — Dieu-Minh Le
(74) *Attorney, Agent, or Firm* — Young & Thompson

(57) ABSTRACT

A micro power outages compensation module for at least one server includes one or more capacitive storage element for storing electrical energy which is releasable for compensating the outages, the module further including a controller for the charging and/or the discharge of the capacitive storage element(s), limiting the charging and/or discharge current of the capacitive storage element(s) sufficiently to enable hot plugging and/or unplugging of the module even during operation of the server.

20 Claims, 3 Drawing Sheets

MICRO POWER OUTAGE COMPENSATING MODULE FOR A SERVER

FIELD OF THE INVENTION

The invention relates to the field of micro power outage compensation modules and to the field of computers incorporating such compensation modules.

BACKGROUND OF THE INVENTION

In a first prior art, electronic systems are known in which failure of the power supply is handled at AC (Alternating Current) level. For example, an Uninterruptible Power Supply (UPS) contains a rectifier, batteries and an inverter to compensate for outages of a few minutes in electrical power supplied by the AC network. To support a failure in an AC-to-DC (Alternating Current to Direct Current) converter or in a power supply unit (PSU), the latter can be redundant, for example according to a 1+1 scheme. In this hypothesis, the two outputs of the power supply units are connected together at the motherboard of the information processing equipment to form a DC supply rail, for instance a 12V rail. This 12V rail feeds a number of downstream load points which are DC to DC voltage converters supplying various power supply voltages to the integrated circuits. Motherboards support several dozens of different load points the power output ranges of each being between a few hundred milliwatts and a few watts. In such a system, the failure of a single load point usually results in a fatal error that results in the loss of data in volatile memory.

According to a second prior art, it is known to use a power backup system based on a power supply outages compensation module for guaranteeing reliability and availability of systems into which it is integrated. It is applied to information processing systems which generally include volatile memory devices and electrical power supply apparatus. Without a compensation module, any major failure of the power supply device results in loss of data stored in the volatile memories. This compensation module performs the function for a power supply backup system to ensure both automatic data backup and easy maintainability of the associated backup system. Maintenance of this type of compensation module is tricky. Indeed, when capacitive storage elements in this type of compensation module need to be changed or checked, the module can be extracted only when the entire system is stopped, that is to say is not running. This means the system's servers must be turned off.

SUMMARY OF THE INVENTION

The object of the present invention is to provide a module for compensating for micro power outages which at least partially overcomes the aforementioned drawbacks.

More particularly, the invention aims to provide a module for compensating for power supply micro power outages which can be suddenly plugged out of the system, even during operation of said server or said servers of the system. This is also called "hot-swapping" or "hot unplugging".

More particularly, the invention also aims to provide a module for compensating for micro power outages which can be suddenly plugged back into the system, even during operation of said server or servers of the system. This is also called "hot plugging".

As capacitive electrical energy storage elements are storage elements that are able to store considerable energy, especially when supercapacitors are employed, their unplugging and reinsertion "hot", that is to say during operation of the one or more server(s) managed by the compensation module in which they are incorporated, would appear to present a challenge.

Indeed, their large storage capacity resulting in an ability to store significant amounts of energy, which in addition is quickly releasable due to their capacitive aspect, makes the risk of excessive inrush current significant, leading to a momentary collapse of the voltage level of the power supply, thereby increasing the risk of system failure during a "hot unplugging" and or during a "hot plugging" operation. There is therefore a technical prejudice against "hot unplugging" and or a "hot plugging" of a component comprising one or more capacitive elements for storing electrical energy having a high storage density.

The invention aims to overcome this technical prejudice by integrating a charging and/or discharge current limitation for the capacitive storage elements and the management of this current limitation by a controller, making possible their hot unplugging or hot plugging without significant risk of excessive inrush current that can cause significant disturbance to the power supply system which in turn could cause a malfunction of the servers and a loss of data in volatile memory in this or these servers.

To this end, the present invention provides a module for compensating for micro power outages in at least one server, comprising at least one capacitive storage element for electrical energy which can subsequently be released for compensating said outages, which is characterized in that it also comprises a controller for charging and/or discharge of said capacitive storage element, limiting a charging and/or discharge current of said capacitive storage element sufficiently to allow said module to be plugged in and/or unplugged even during operation of said server.

To this end, the present invention also provides a computer comprising: one or more microprocessors, several dual memories each including a RAM memory, a nonvolatile memory and a controller adapted to save the contents of the RAM memory in non-volatile memory and to reconfigure the RAM memory with the contents of the nonvolatile memory, a main power rail for powering said microprocessor and said dual memories during operation of said computer in the absence of a micro power outage, adapted to be connected to an external power supply, a secondary power rail for powering of said dual memories during operation of said computer at least when a predetermined duration of a power outage is exceeded, said secondary power rail not powering the microprocessors, a module for compensating for micro power outages comprising capacitive storage elements for electrical energy, which is adapted to supply electric energy to said main power rail on the occasion of micro power outages, but only for said predetermined duration of micro power outage, and which is also adapted to supply electrical energy to said secondary power rail during said power outages, when said predetermined duration of micro power outage has been exceeded.

The secondary power rail is also called a standby power rail.

A micro power outage corresponds to a brief interruption in supply from the utility providing alternating current.

The computer according to the invention or according to preferred embodiments of the invention may employ a micro power outages compensation module according to invention or according to preferred embodiments of the invention. The computer can be a server managed by a compensation module. The same compensation module could also manage multiple servers.

The micro outage compensation module for a server connects directly to the power supply board without the need for cables between the module and the power supply board.

According to preferred embodiments, the invention comprises one or more of the following features used separately or in partial or full combination therebetween, with either one of the aforementioned subject matter.

Preferably, the module for compensating for micro power outages also comprises an auxiliary power supply switch connecting said controller to said capacitive storage element and which changes state upon unplugging said module during operation of said server so that said controller is powered by said capacitive storage element. Thus, on the occasion of a micro power outage, what practically amounts to temporary self-powering of the controller, in point of fact by the one or more capacitive storage elements a joining said controller in the compensation module, allows the controller to handle the sequencing of the power supply outage management operations, and this taking place even though the controller is itself also, like the other components on the network, the victim of this micro power outage which needs to be dealt with. When the module is unplugged during operation of the server, what we are particularly referring to here is the beginning of the unplugging of the module, and prior to the unplugging of the module being effective or completed, giving time for the unplugging of the said module to be managed correctly.

Preferably, the module for compensating for micro power outages also comprises a discharge switch connecting a discharge resistor to said capacitive storage element and which is driven by said controller during unplugging of said module during operation of said server. The capacity to storage element or elements are capable of storing a considerable amount of energy for supplying a least the controller for the period of time needed to manage a micro power outage and to be able to supply the dual memories for the period of time needed to back up the data. As the amount of stored energy can be significant, this can represent a source of danger to the operator performing staff and unplugging. The discharge resistor makes it possible to discharge the essential part of this energy so as to render handling of the compensating module free from notable risk when the operator is performing hot unplugging or "surprise removal".

Preferably, the module for compensating for micro power outages includes several capacitive storage elements and/or it compensates micro power outages occurring on a supply rail of one or more servers. In this way, one single compensation module can be sufficient to manage an electrical network.

Preferably, the at least one capacitive storage elements are arranged to provide a backup power both during a micro power outage and when backing up the contents of one or more volatile memories to one or more non-volatile memories. In addition to these functions of providing standby electrical power, the invention consequently provides the additional function of temporarily supplying temporary electrical power to a controller of the compensating module on the occasion of hot plugging or hot unplugging of the compensating module.

Preferably, the capacitive storage element or elements comprise one or more supercapacitors. Supercapacitors, although having a more limited capacity than other sources of energy of, for instance, an electrochemical nature, are nevertheless able to deliver their peak power on a much higher number of occasions over the lifetime of the system, and thus handle a distinctly higher number of micro power outages.

Preferably, the compensating module comprises a first power supply terminal which is adapted to be connected to an external power supply and which is connected to said capacitive storage element so as to charge them from said first power supply terminal and to discharge them to said first power supply terminal and a second power supply terminal which is adapted to be connected to said external power supply and which is connected to said controller so as to supply electrical power to said controller. The capacitative storage element or elements and thereby store energy originating from the utility network when the latter is operating normally, this energy being able to be restituted to the controller on the occasion of a micro power outage.

Preferably, the compensating module includes no capacitance able to cause waveform distortion which is connected to said first power supply terminal and whose value exceeds 500 nanofarads. In this way, a somewhat complex management of such capacitance does not hinder or complicate management of micro power outages by the compensating module, nor the hot unplugging of this compensating module.

Preferably, the compensating module includes a first power supply terminal which is adapted to be connected to an external power supply, a main DC/DC converter which is located between said capacitive storage element and said first power supply terminal and which comprises a built-in current limiter which is activated upon said module being plugged in during operation of said server. In this way, the risk of seeing an excessive inrush current which could be brought about by uncontrolled charging of the capacitive storage element or elements and which could lead to a significant voltage drop on the main power rail, is avoided.

The external electrical power supply incorporates, for its part, an AC to DC converter, this converter being located between the input utility electrical network and the said first power supply terminal.

Preferably, the compensating module includes a second power supply terminal which is adapted to be connected to an external power supply, a secondary DC/DC converter and a current limiter which are located between said controller and said second power supply terminal. In this way, under normal operating conditions of the utility supply, the controller is powered from the utility network, without any excessive current peaks.

Preferably, the controller includes a function for detecting a sudden unplugging of said module, this function being connected to a pin which is shorter than the other pins in order to indicate a sudden unplugging operation before it is completely carried out. In this way, the controller detects, and can perform management at a very early stage, of a sudden unplugging operation of the capacitive storage elements even before its operation is effective, and consequently even before being deprived of electrical power originating from these capacitive storage elements. This is made possible by the differing lengths of the pins used the plugging the compensating module into the computer.

Preferably, the controller includes a function for detecting said micro power outages which issues one or more requests for reduction of power consumption to one or more servers as soon as a micro power outage is detected. In this way, as soon as a micro power outage is detected, the majority of the electrical components managed by the controller will rapidly reduce their electrical consumption, allowing the capacitive storage elements to deal even with micro power outages which last a certain time, and this despite their energy storage capacity which remains relatively limited when compared to conventional sources of power, for example of the electrochemical type.

Preferably, the compensating module can be plugged in and/or unplugged even during operation of said one or more servers.

Preferably, the servers or at least some of said servers each comprise one or more microprocessors and/or one or more memories.

Preferably, the said RAM memory is a DRAM memory and said nonvolatile memory is a Flash memory.

Preferably, said computer is a supercomputer comprising a plurality of microprocessors.

The more the system, which is dependent upon a same utility source of power and being managed by the same module for handling micro-outages in said source of power, is complex and/or contains sensitive data which needs to be backed up, the greater the usefulness of the compensating module according to the invention, which is particularly effective from the point of view of relatively reduced complexity and electrical power consumption.

According to preferred embodiments of the invention, the module for compensating micro outages in the power supply makes it possible when compared to a solution consisting in performing backup on an SSD type disk, to limit to the strict minimum the power consumption of the system during the critical operation during which time the processors and the input/output circuits are not powered, only the memory being powered. The size and cost of the capacitive storage elements are consequently heavily reduced.

According to preferred embodiments of the invention, the module for compensating micro outages in the power supply makes it possible, when compared to a solution employing storage of energy in an electrochemical battery in example of the lithium-ion or lead acid type, to continue to deliver peak power, which is for example at a level of 1400 W (equivalent to around 120 amps at 12 V), up to 500,000 times over the lifetime of the system, whereas this figure is limited to only around 1000 times in the case of electrochemical batteries.

According to preferred embodiments of the invention, the module for compensating micro power outages allows, compared to a solution where the set of capacitive storage elements are charged to a voltage significantly higher than the external supply voltage, to dispenses with the use of a power converter between the levels of the charging voltage for the capacitive storage elements and the external power supply voltage. This makes it possible to reduce the cost and bulkiness of implementing the main switch of the compensating module which can now be reduced to one single power transistor operating in switching mode. This single transistor will consequently only give rise to a very reduced rise in temperature of the silicon.

Other characteristics and advantages of the invention will become apparent on reading the following description of a preferred embodiment of the invention, given by way of example and with reference to the accompanying drawings.

DETAILED DESCRIPTION OF AN EMBODIMENT

Figure 1:
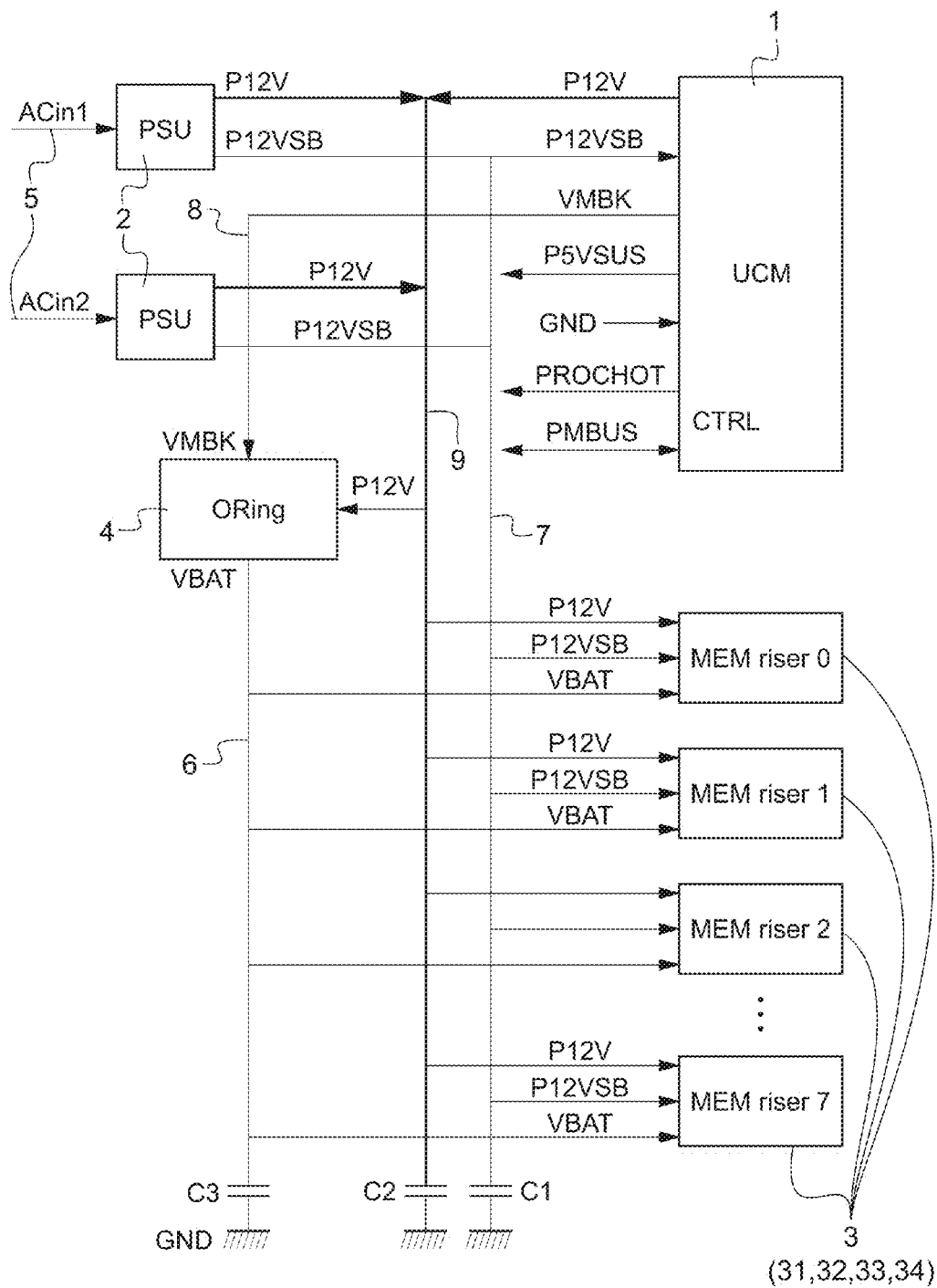
FIG. 1 schematically shows an example of a block diagram of a motherboard of a computer using a micro power outages compensation module according to an embodiment of the invention.

FIG. 1 schematically shows an example of a block diagram of a motherboard of a computer using a micro power outages compensation module according to an embodiment of the invention. A computer or a server will be used interchangeably herein to cover the same type of apparatus. The computer that includes the compensation module will be able to support both short outages or micro power outages of power without alteration of system operation, support longer outages or micro power outages without loss of volatile memory data, support simple failures (as opposed to multiple failures) of the majority of load points and power supply modules without data loss, support maintenance by "hot swapping" of power supply modules as well as of modules of capacitive storage elements of the compensation module.

Figure 2:
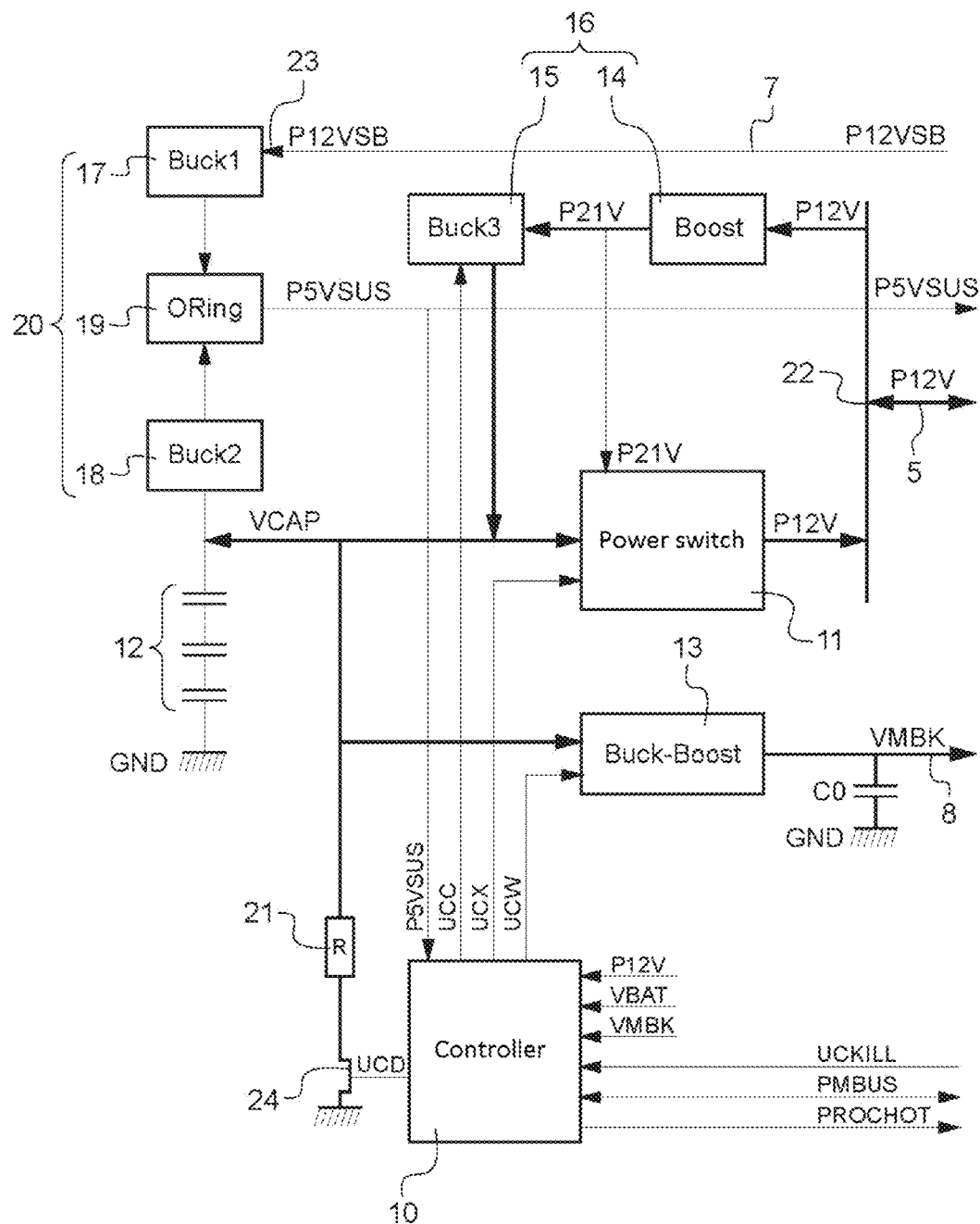
FIG. 2 schematically shows an example of a block diagram of a micro power outages compensation module according to one embodiment of the invention.

To do this, the circuitry of the computer and particularly the circuitry of the compensation module, detailed in FIG. 2, is able to detect the occurrence of a micro power outage and switch over to the local source of energy, detect long outages or micro power outages and save volatile data in nonvolatile memory, to allow "hot swapping" of a power supply module or a capacitive storage element and to reboot the system using the saved data.

In FIG. 1, there can be seen a module 1 for micro power outages compensation, several power supply modules 2, several memory cards, an ORing type converter 4, an external power supply 5 connected to the utility AC supply utility supplying an alternating current, a main power supply rail 9, an auxiliary power supply rail 7 for system startup, a secondary power supply rail made up of sections 6 and 8 located on either side of the converter 4. Each of the rails 6, 7 and 9 is connected to ground via a decoupling capacitor.

Components 1 to 4 have various pins connected to various electrical signals. The P12VSB pin corresponds to the input power allowing system startup: its value is 12V. The P5VSUS pin corresponds to the output power for managing, on the motherboard, the control circuits during backup operations: its value is 5V. This output power is also used in hot pluggable compensation module 1. Voltage P12V corresponds to the main power supply for the motherboard: its value is 12V. This rail is used both for input and output at the interface of compensation module 1. Voltage VMBK corresponds to standby power, also called secondary power used during data backup phases. The UCKILL signal is the input signal for detecting a "hot" or surprise unplugging of the compensation module 1. The PMBus signal on the I2C bus allows the control of the controller of compensation module 1 by a maintenance microprocessor mounted on the motherboard. The PROCHOT signal is the output signal asking the motherboard processors to switch to reduced power consumption mode during a micro power outage.

Memory cards 3 each include one or more dual memories 31, each composed of a volatile memory 32 and a nonvolatile memory 33, memories 32 and 33 being both managed by a controller 34. Dual memory 31 is a NVDIMM (for "Non-volatile Dual in Line Memory Module") type memory. Dual memory 31 of the NVDIMM type for example consists of the combination of a volatile DRAM technology memory 32 and a memory 33 in non-volatile Flash technology, combined with an on-board controller 34 to manage backups and data restorations. Multiple power inputs provide power to each dual memory 31. At least one of these inputs is from a local source of energy. The number of dual memories can be quite large on the motherboard, for example 48 per server. In normal operation, the power consumed by these dual memories 31 can reach a significant percentage of the total power dissipated by the server. For example and by way of numerical illustration, the 48 dual memories 31 can dissipate 480 W for a 1400 W server, or 34% of the total dissipated power. Compared to this, when the system is run from standby power, dual memory 31 consumption is much lower, for example of the order of 240 W, equivalent to 17% of the total dissipated power. All these dual memories 31 are grouped in eight memory riser cards, each supporting up to six dual memories 31 with a capacity of 4 GB and consuming 10 W maximum in normal running and 5 W in backup, coupled with eight daughterboards each dissipating some ten watts.

The two power supply modules 2 correspond to two 12V power supplies arranged in 1+1 redundancy, with an auxiliary output of 12V for standby for rebooting corresponding to voltage P12VSB.

The computer shown in the FIG. 1 also includes two slots for microprocessors having a dissipation of 150 W each (not shown in FIG. 1) and a compensation module 1 supporting five 2000 F supercapacitors arranged in series. The overall power consumption of the computer in operation is consequently of the order of 1400 W.

It is these local power sources that ensure preservation of system state in nonvolatile memory for any simple failure of the utility power supply. The computer shown in FIG. 1 can thus withstand simple outages with minimal impact on its operation. It can also, if necessary, enable replacement of failed modules to avoid having to undergo a second failure while the system is in degraded mode. A brief power outage is for this reason considered as a simple failure of power supply.

Compensation module 1 acts as an emergency power supply in the following two cases, namely, firstly, to ensure the operation of the computer during short outages of utility power and secondly to safeguard the contents of volatile memory in the case of long outages of AC utility power. Compensation module 1 then acts as a third power supply module that acts as backup for the two standard power supply modules 2. It adds to the interface of these two power supply modules 2 a secondary power rail 8 which is an input to the converter 4 supplying the backup voltage to the memory subsystem. This separation allows total disconnection of the powering of microprocessors, disks, and input/output circuits during the backup operation of the content of volatile memories 32 in the nonvolatile memories 33.

FIG. 2 schematically shows an example of a block diagram of a micro power outages compensation module board according to one embodiment of the invention. Compensation module 1 includes a controller 10, a power switch 11, capacitive storage elements 12, a buck-boost type DC-to-DC converter 13, a main DC-to-DC converter 16 with a first booster stage 14 and a second buck stage 15, a buck-type DC-to-DC converter 17, a buck-type DC-to-DC converter 18, a device 19 the output of which generates a stabilized voltage P5VSUS of 5V value, all the elements 17, 18 and 19, forming a secondary DC-to-DC converter 20, and a discharge resistor 21. The power switch 11 controls access to the first terminal 22 of the power supply connected to the external power supply 5, of both the capacitive storage elements 12 as well as main converter 16. The converter 17 is connected to a power supply 7 via second power supply terminal 23. Passage of the discharge current from capacitive storage elements 12 to ground through the discharge resistor 21 is controlled by transistor 24 which itself is controlled by the controller 10. The capacitive storage elements 12 are advantageously supercapacitors. The device 19, for example of the ORing type, incorporates both a function of auxiliary power switch and a function of current limiter.

The interface of the compensation module with other functions of the motherboard is performed by the following signals present on the corresponding pins. Power supply P12V is connected to the external power supply 5 connected to the power supply modules 2 which are themselves provided with AC to DC converters connected to the utility AC supply. These two power supply modules 2 may preferably operate in 1+1 redundancy. The level of the external power supply 5 is 12V. Each power supply module 2 provides a low power supply P12VSB allowing system startup when the utility AC supply is present. Power supply P12VSB also has a value of 12V. Backup power supply VMBK provided by the compensation module 1 is connected to the converter 4 which is described in FIG. 1. The UCKILL signal is connected to ground (GND for "Ground") of the motherboard by a pin that is shorter than the others. The P5VSUS power supply and PROCHOT and PMBus signals are connected to the motherboard power management features that are not shown in FIG. 2 for simplicity.

In compensation module 1, a secondary low power converter 17 starts automatically with the rise of auxiliary power supply P12VSB and provides a first auxiliary voltage P5VSUS to controller 10. The booster stage 14 of the main converter 16 generates a power supply P21V, having a value of 21V value, which is used by the buck stage 15 of main converter 16 and the control circuits for the gates of the power switch circuit 11. The controller 10 starts the buck stage 15 of the main converter 16 to ensure charging of the storage elements 12 connected between ground and the VCAP power rail. Power switch 11, the converter 13 and the discharge resistor 21 are also connected to this VCAP power rail. The controller 10 is able to handle all the local voltages such P12V, VBAT and VMBK.

The controller 10 can take the form of a CPLD ("Complex Programmable Logic Device") type circuit, an FPGA ("Field Programmable Gate Array"), a DSP ("Digital Signal Processor") type of microcontroller or a combination thereof. Its role is to sequence the charge and discharge operations of capacitive storage elements 12 in the various phases of operation, these being: powering up of the system, detection of a utility AC supply micro power outage, detection of an AC power failure with or without saving data to non-volatile memory, "hot" swapping of compensation module 1.

During power-up, converter 17 starts the controller 10. The power switch 11 is maintained in the OFF state by the UCX signal from controller 10. The controller 10 starts the buck stage 15 of converter main 16 through the UCC signal. The buck stage 15 of the main converter 16 charges the capacitive storage elements 12 at constant current to their nominal voltage and switches to float mode. When the VCAP power rail reaches a first determined threshold, the converter 18 is started and gives support to converter 17 by means of the transistors of device 19 of the ORing type the output of which is voltage P5VSUS of a value of 5V which supplies the controller 10. When the VCAP power rail reaches a second predetermined threshold value, converter 13 is started by the UCW signal from controller 10 and provides backup voltage VMBK to the computer's motherboard shown in FIG. 1. During this power up, the capacitive storage elements 12 have been isolated from the main power rail P12V by power switch 11. Therefore, they do not short circuit the outputs of the power supply modules 2 shown in FIG. 1. In their absence, "hot" connection of compensation module 1 would cause these two power supply modules to trip.

Upon detection of a micro power outage, the controller 10 detects a drop in the voltage level on the main power rail P12V supply by means of a threshold comparator and responds in less than a few microseconds by the closure of the switch power 11. The internal resistance of the capacitive storage elements 12 and the power switch 11 is determined so that the main power rail P12V stabilizes just at a first threshold VT1. During a given period T1, which is usually a few ms, the capacitive storage elements 12 provide the motherboard of the computer with its rated power. Beyond period T1, controller 10 issues signal PROCHOT requesting the microprocessors of the motherboard to switch to low-power mode. With microprocessors currently available, the power reduction can reach 80% compared to the nominal power. The response time T2 to this reduction in charge is less than 1 ms. When the micro power outage ends, the P12V supply voltage returns to its nominal value since power supply modules 2 have restarted and are again capable of powering the motherboard normally. In the seconds after a micro power outage, buck 15 of the main converter 16 re-charges the storage capacitor elements 12 to their nominal voltage. The charging time is proportional to the actual duration of the micro power outage.

Upon detection of an interruption in external power from the AC utility with backup of data in non-volatile memory, the controller 10 detects a drop in the voltage level on the main power rail P12V by means of a threshold comparator and reacts within a few microseconds by closing power switch 11. The internal resistance of the capacitive storage elements 12 and of the power switch 11 is determined so that the main power rail P12V stabilizes just at the level of a first threshold VT1. For a given time T1, which is usually a few ms, the capacitive elements 12 provide storage to the motherboard rated power. Beyond T1, the controller 10 issues signal PROCHOT that asks the microprocessors of the motherboard to switch to low-power mode. With microprocessors currently available, the power reduction can reach 80% compared to the nominal power. The response time T2 to this drop in charge is less than 1 ms. For a set time T3, beyond T1+T2, the controller 10 assumes that the drop in voltage P12V originates from a micro power outage and waits. While waiting, if at the end of T1+T2+T3, the voltage of signal P12V has not risen above the first threshold VT1, the controller 10 passes to the phase of backing up data in nonvolatile memory. At this point in time, the controller opens power switch 11, which has the effect of causing a voltage drop in voltage P12V below the first threshold VT1. The capacitive storage elements 12 are consequently isolated from the main power rail supply P12V and the remaining energy will be used to supply backup rail VMBK during saving of data in non-volatile memory. Beyond T1+T2+T3, and during a time T4, converter 13 generates a regulated voltage of 12V on the VMBK backup rail. The particular topology of converter 13 ensures the stability of the output voltage both in the case where the voltage on the power rail VCAP is lower than the voltage value on the backup rail VMBK as well as when this voltage value on the VCAP power rail is higher than the voltage value on the VMBK backup rail. Thus, the system works even in the case of low load where the value of the voltage on VCAP power rail has not fallen below the first threshold VT1 at the end of the period T1+T2+T3.

Compensation module 1 does not have a so-called bulk capacitor on the main power rail P12V in order not to disturb the voltage during operation of "hot" swapping. The motherboard circuitry is on the other hand designed so that the backup rail VMBK can include output capacitors, required for the correct operation of converter 13. Indeed, the diodes of the converter 4 of the ORing type mounted between the two sections VMBK and VBAT of the backup rail (only visible in FIG. 1) block all current inrush from the main power rail P12V of the motherboard during "hot" plugging.

In summary, the compensation module, shown in FIG. 1 has two functions, namely the power compensation during micro power outages and the provision of backup power to the dual memories during data backups subsequent to an AC power failure, all this in a structure and system complexity which remains relatively simple, and therefore relatively inexpensive.

Compensation module 1 can provide a sustained voltage to the motherboard for critical circuits during power failure phases, i.e. for circuits that limit the impact of the loss of power as regards all non-volatile memories. This improves the reliability of the system. The capacitive storage elements 12, and in particular the supercapacitors have better energy efficiency than some other types of uninterruptible power supply systems. This therefore reduces overall system power consumption.

The compensation module 1 in particular has the useful feature of being able to be hot swapped i.e. without stopping the system. Indeed, during a surprise "hot" removal of compensation module 1, the controller 10 remains self-powered by the residual energy in the capacitive elements 12. This temporary self-powering allows better management of the discharge cycle through the discharge resistor 21, by indicating clearly to the maintenance operator that discharge is not complete. Appropriate indicators, such as LEDs, indicate the danger of remaining energy and thus allow the maintenance operator to wait for the right moment before working inside the compensation module to perform maintenance work there. This improves the electrical safety of the system.

Figure 3:
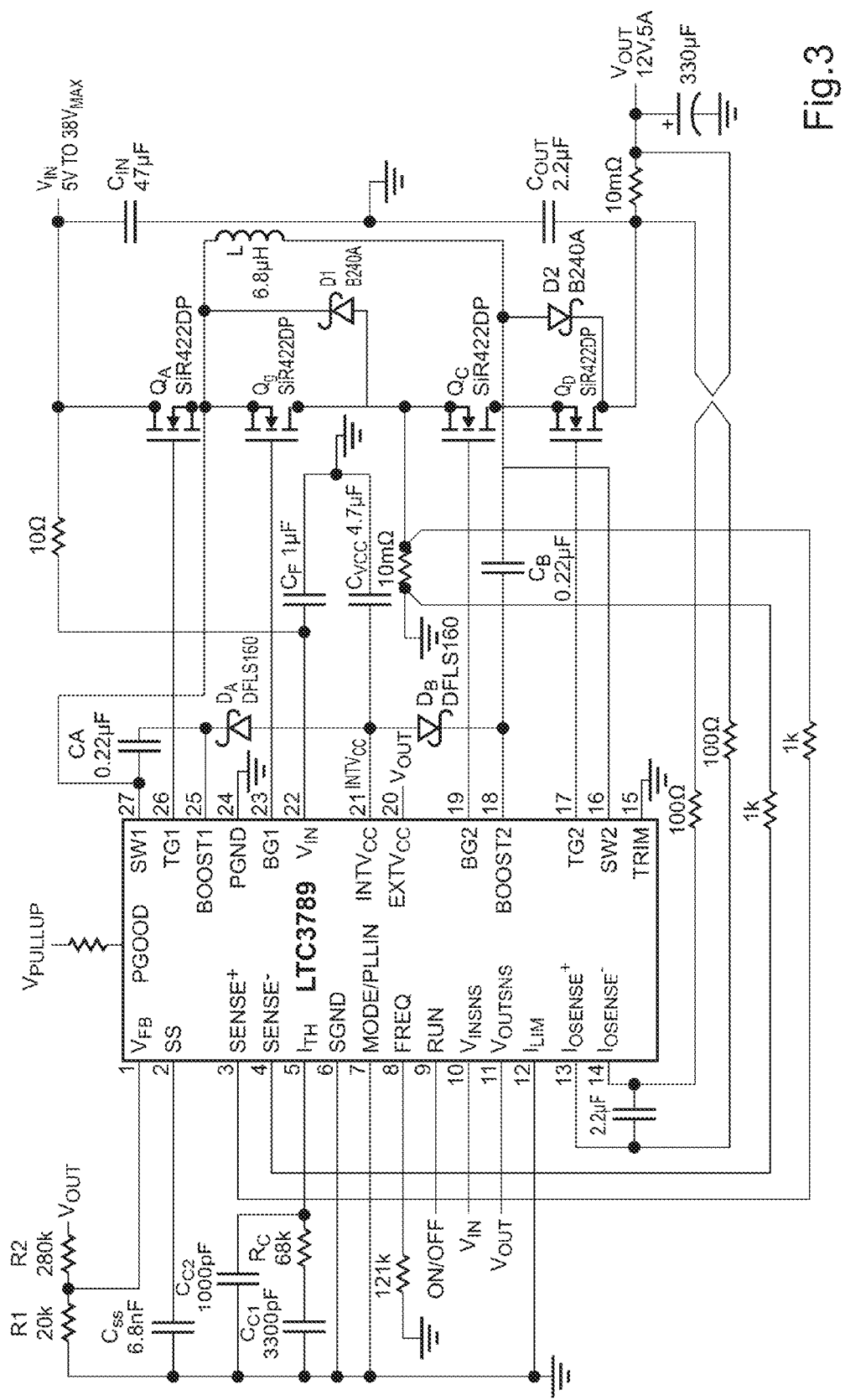
FIG. 3 schematically shows an example of DC to DC voltage converter according to one embodiment of the invention.

FIG. 3 schematically shows an example of a DC-to-DC converter according to one embodiment of the invention. The electrical diagram is self-explanatory, and as it contains all the component references and all numerical values, it will not be described in greater detail. This circuit represents an example of the internal circuitry that can be used in converter 13 which feeds secondary power rail 8 on which the 12V voltage VMBK is present.

We shall now discuss some possible scenarios. These scenarios use the preferred examples of the computer and correction module described with preferred numerical values. These scenarios give quantitative results in terms of power consumption and reserve electrical energy storage. In these scenarios, the capacitive storage elements are supercapacitors, and will be called as such.

In a first normal operating scenario, the complete unit dissipates 860 W when operating normally, leading, taking account of the efficiency of the converters which is about 80% and the consumption of the cooling apparatus which is approximately 200 W, to a server which is consuming 1300 W. The energy reserve consists of a set of supercapacitors made up of five 2000 F cells in series or 400 F equivalent cells, charged to 12.5V. If we neglect the parasitic resistance of the transfer switches and supercapacitors 12, the usable value of the stored energy is equal to $½*C*V2=31250$ J. The DC-to-DC converters located between the power rail VCAP and the power rails, that is the main power rail as well as the 12V rail and the backup rail carrying voltage VBAT, are considered to have an average efficiency of 70%, this value being limited by the internal resistance of the supercapacitors 12 themselves. Consequently, a consumption of 1300 W during a period of 4 ms will be responsible for a reduction of the stored energy equal to $1300*0.004/0.7~7.5$ J.

Turning now to a second scenario for detecting a micro outage of duration equal to 250 ms, which simultaneously affects both AC inputs of the two power supply modules 2, AC1 and AC2. The case where only one of them is affected is trivial because the two power supply modules 2 employ 1+1 redundancy and in that particular case one would take over from the other. After a half-wave of 10 ms maximum duration, AC_FAIL signals are sent from power supply modules 2 to the controller 10 of compensation module 1. The controller 10 issues a LPRQ (Low Power Request) signal to the microprocessors, which in the case of an Intel Xeon socket on a Brickland platform can be received at bidirectional pin PROCHOT #. When this signal is enabled by the platform, the microprocessor reduces its consumption in less than 1 ms to a first power level "Pthrottle" then, in less than 4 ms, to a second power level "PL2" which is configurable in the BIOS settings. This pin can advantageously be configured in "Fast PROCHOT #" mode which makes it possible to provide a first reaction regarding consumption in less than 100 µs.

In this second scenario, energy consumption on supercapacitors 12 is determined by the setting of level "PL2" and by the residual consumption of the platform through its inputs and outputs and its memories. The consumption of the system being analyzed is, in this state "PL2", of the order of 250 W. The clock frequencies of the microprocessors have been able to be set to their lowest value, with the result that memory input and output activity is also reduced to a minimum. The cooling fans may optionally be momentarily stopped by the controller 10, the thermal inertia of the heat sinks allowing such an operation without a risk of overheating the electrical circuits. Energy consumption from the reserve of 28800 J is still very low in this case. It amounts in effect to $87.8+7.5=95.3$ J, equivalent to less than 0.3% of the stored energy. The final voltage across all the supercapacitors 12 will be virtually unchanged.

We shall now consider a third scenario of detecting a duration of micro power outage of between 250 and 800 ms. The system will decide, after 250 ms have elapsed, to initiate backup of the volatile memory 32 in the nonvolatile memory 33 within dual memory 31, while maintaining the ability to instantly restart operation if utility power comes back before the expiry of the duration of 800 ms. The operating system (OS) is stopped and all caches are flushed, that is to say imaged, i.e. converted quickly into DRAM (Dynamic Random Access Memory) memory. This operation is very brief, typically less than 1 ms. From this point on, memory is only consuming energy for copying the image into non-volatile memory, for a value of 240 W. Writing speed being 4 GB per 30 s per dual memory 31, only a small part of the image will be copied in 800 ms. Energy consumption from the reserve of 31250 J amounts to $7.5+87.8+188.5=284$ J, i.e. less than 1% of the stored energy. The final voltage across all supercapacitors 12 will be equal to 12.44V.

We shall now consider a fourth scenario involving detecting a duration of power outage greater than 800 ms. The duration of 800 ms being exceeded, the managing controller will lose control of the system and dual memories 31 will end data backup in standalone mode. If utility power is restored before the end of this backup, this backup will nevertheless take priority over a return to control by the controller which will have to wait until writing into non-volatile memory has terminated, for reasons of memory image consistency. The cooling fans should in this case be stopped by controller 10 to avoid consuming unnecessary power from the energy reserves. Maintaining a 4 GB per 30 s writing speed per dual memory 31, with the duration of the backup operation being at most equal to 30 s since the 48 dual memories 31 operate in parallel, power consumed from the reserve of 31250 J therefore amounts to $7.5+87.8+188.5+7200$ $J=7484$ J which is equivalent to about 25% of the stored energy. The final voltage across all the supercapacitors 12 will be equal to 10.9V. This still leaves a margin for supporting dual memories 31 of higher capacity.

We shall now consider a fifth scenario involving hot swapping of a compensation module 1. Unpluggable compensation module 1 is removed by the maintenance operator without intervention on the part of the management controller. This mode is sometimes called surprise unplugging or surprise hot remove. Nevertheless, to avoid losing backup data, a visual indicator, for example of the LED type, visible to the operator, indicates any backup operation which is running. The operator must wait for the lamp to go out before performing this "surprise" removal. With the visual indication off, as soon as the module is distanced from its connector by at the most 1 mm, a short pin will become disconnected from the card cage and indicate to on-board controller 10 that compensation module 1 has been disconnected from the system. Because controller 10 is self-powered from the set of supercapacitors 12, it forces opening of power switch 11 to avoid any undesirable effect upon separation of the power terminals from the main 12 V power supply rail 9. Additionally, controller 10 can automatically execute the operations of energy discharge to allow a repair operation to be performed on compensation module 1, without any risk to the maintenance operator. Power switch 11 remains open as long as the residual voltage remains higher than a value, which is very low, on power rail VCAP. When a new module which consequently is not charged, is plugged in, controller 10 will take its power from the 12 V power input consequently allowing the set of supercapacitors 12 to charge under controlled current conditions. This current limitation, which for instance is 3% of the maximum current of power supply modules 2, allows recharging of compensation module 1, without the need for power supply modules 2 to be over-dimensioned to handle output current.

Obviously, the present invention is not limited to the examples and embodiments which have been described and illustrated, but may be subject to numerous variations accessible to those skilled in the art.

The invention claimed is:

1. A module for compensating for micro power outages in at least one server, comprising:
   a plurality of pins, a first of the pins having a length shorter than the length of a remainder of the pins;
   at least one capacitive storage element for electrical energy which can subsequently be released for compensating said micro power outages; and
   a controller for controlling at least one of the group consisting of i) charging of said at least one capacitive storage element by limiting a charging current of said at least one capacitive storage and ii) discharge of said capacitive storage element by limiting a discharge current of said at least one capacitive storage element, sufficiently to allow said module to be plugged in during operation of said at least one server and to be unplugged during operation of said at least one server, wherein the controller includes a function for detecting a sudden unplugging of said module, said function being connected to the first pin which is shorter in length than the remaining pins in order to indicate a sudden unplugging operation before the unplugging operation is completely carried out.

2. The module for compensating for micro power outages according to claim 1, further comprising an auxiliary power supply switch connecting said controller to said at least one capacitive storage element and which changes state upon unplugging said module during operation of said at least one server so that said controller is powered by said at least one capacitive storage element.

3. The module for compensating for micro power outages according to claim 1, further comprising a discharge switch connecting a discharge resistor to said at least one capacitive storage element and which is driven by said controller during unplugging of said module during operation of said at least one server.

4. The module for compensating for micro power outages according to claim 1, comprising plural of said at least one capacitive storage element, wherein the module compensates micro power outages occurring on a supply rail of said at least one server.

5. The module for compensating for micro power outages according to claim 1, wherein the at least one capacitive storage element is arranged to provide a backup power both during a micro power outage and when backing up the contents of one or more volatile memories to one or more non-volatile memories.

6. The module for compensating for micro power outages according to claim 1, wherein the at least one capacitive storage element comprises at least supercapacitors.

7. The module for compensating for micro power outages according to claim 1, further comprising a first power supply terminal which is adapted to be connected to an external power supply and which is connected to said at least one capacitive storage element so as to charge said at least one capacitive storage element from said first power supply terminal and to discharge said at least one capacitive storage element to said first power supply terminal and a second power supply terminal which is adapted to be connected to said external power supply and which is connected to said controller so as to supply electrical power to said controller.

8. The module for compensating for micro power outages according to claim 7, wherein the module includes no capacitance able to cause waveform distortion which is connected to said first power supply terminal and whose value exceeds 500 nanofarads.

9. The module for compensating for micro power outages according to claim 1, further comprising a first power supply terminal which is adapted to be connected to an external power supply, a main DC/DC converter which is located between said at least one capacitive storage element and said first power supply terminal and which comprises a built-in current limiter which is activated upon said module being plugged in during operation of said at least one server.

10. The module for compensating for micro power outages according to claim 9, further comprising a second power supply terminal which is adapted to be connected to an external power supply, a secondary DC/DC converter and a current limiter which are located between said controller and said second power supply terminal.

11. The module for compensating for micro power outages according to claim 1, wherein said controller includes a function for detecting said micro power outages which issues one or more requests for reduction of power consumption to said at least one server as soon as a micro power outage is detected.

12. A module for compensating for micro power outages according to claim 1, configured for plural servers, wherein the module can be plugged in during operation of said one or more servers and unplugged during operation of plural servers.

13. The module for compensating for micro power outages according to claim 12, wherein said plural servers or at least some of said servers each comprise one or more microprocessors or one or more memories.

14. The module of claim 1, wherein,
the controller controls charging and discharge of said at least one capacitive storage element, limiting the charging current and the discharge current of said at least one capacitive storage element to thereby allow said module to be plugged in during operation of said server.

15. The module of claim 1, wherein,
the controller controls charging and discharge of said at least one capacitive storage element, limiting the charging current and the discharge current of said at least one capacitive storage element to thereby allow said module to be unplugged during operation of said server.

16. A computer comprising:
at least one microprocessor,
plural dual memories, each memory including a RAM memory, a nonvolatile memory and a controller adapted to save the contents of the RAM memory in non-volatile memory and to reconfigure the RAM memory with the contents of the nonvolatile memory,
a main power rail for powering said at least one microprocessor and said dual memories during operation of said computer in the absence of a micro power outage, adapted to be connected to an external power supply,
a secondary power rail for powering of said dual memories during operation of said computer at least when a predetermined duration of micro power outage is exceeded, said secondary power rail not powering the at least one microprocessor, and
a module for compensating for micro power outages, said module comprising i) at least one capacitive storage elements for electrical energy which can subsequently be released for compensating said micro power outages, and ii) a controller for charging, or discharge, of said at least one capacitive storage element, limiting respectively a charging or discharge current of said at least one capacitive storage element sufficiently to allow said module to be plugged in and unplugged during operation of said server, the controller further including a function for detecting a sudden unplugging of said module, said function being connected to a pin which is shorter than the other pins in order to indicate a sudden unplugging operation before the unplugging operation is completely carried out, the at least one capacitive storage element being adapted to supply electric energy to said main power rail on occasion of micro power outages, but only for said predetermined duration of micro power outage, and being also adapted to supply electrical energy to said secondary power rail, during micro power outages, when said predetermined duration of micro power outage has been exceeded.

17. The computer of claim 16, wherein said RAM memory is a DRAM and in said nonvolatile memory is a Flash memory.

18. The computer according to claim 16, wherein said computer is a supercomputer comprising a plurality of microprocessors.

19. The computer of claim 16, wherein,
the controller controls charging and discharge of said at least one capacitive storage element, limiting the charging current and the discharge current of said at least one capacitive storage element to thereby allow said module to be plugged in during operation of said server.

20. The computer of claim 16, wherein,
the controller controls charging and discharge of said at least one capacitive storage element, limiting the charging current and the discharge current of said at least one capacitive storage element to thereby allow said module to be unplugged during operation of said server.

* * * * *